United States Patent
Ng et al.

(10) Patent No.: US 9,967,193 B2
(45) Date of Patent: May 8, 2018

(54) METHOD AND SYSTEM FOR INCREASING DATA FLOW TRANSMISSION

(75) Inventors: Kam Chiu Ng, Hong Kong (HK); Ho Ming Chan, Hong Kong (HK); Kit Wai Chau, Hong Kong (HK); Patrick Ho Wai Sung, Hong Kong (HK); Alex Wing Hong Chan, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 150 days.

(21) Appl. No.: 14/422,175

(22) PCT Filed: Sep. 4, 2012

(86) PCT No.: PCT/IB2012/054547
§ 371 (c)(1),
(2), (4) Date: Feb. 17, 2015

(87) PCT Pub. No.: WO2014/037760
PCT Pub. Date: Mar. 13, 2014

(65) Prior Publication Data
US 2015/0215214 A1  Jul. 30, 2015

(51) Int. Cl.
*H04L 12/825* (2013.01)
*H04L 12/801* (2013.01)
(Continued)

(52) U.S. Cl.
CPC ............ *H04L 47/193* (2013.01); *H04L 69/12* (2013.01); *H04L 69/14* (2013.01); *H04L 69/163* (2013.01); *H04L 1/1887* (2013.01); *H04L 47/25* (2013.01)

(58) Field of Classification Search
CPC ............ H04L 69/16; H04L 2001/0097; H04L 61/103; H04L 69/166; H04L 12/5875; H04L 51/30; H04L 67/2819
See application file for complete search history.

(56) References Cited

U.S. PATENT DOCUMENTS

| | | | |
|---|---|---|---|
| 7,295,512 B2 | 11/2007 | Takatani et al. | |
| 2005/0289231 A1* | 12/2005 | Harada | G06Q 10/00 709/224 |

(Continued)

FOREIGN PATENT DOCUMENTS

| | | |
|---|---|---|
| CN | 101193448 A | 6/2008 |
| CN | 101547210 A | 9/2009 |
| CN | 101193448 B | 6/2013 |

OTHER PUBLICATIONS

First Office Action in Chinese Application No. 201280075629.1 dated Apr. 18, 2017.

(Continued)

*Primary Examiner* — Awet Haile
(74) *Attorney, Agent, or Firm* — Fisher Broyles LLP

(57) ABSTRACT

A network system and method regarding data flow transmission, including: a first network connection interface interconnecting with a transmitter; at least two second network connection interfaces interconnecting with a receiver through at least two access networks; and a control unit, used for receiving packets of a data flow from the transmitter by the first network connection interface, selecting an access network from the access networks connecting to the at least two second network connection interfaces to send the packets embedded with the packets of the data flow to the receiver, determining whether to generate at least one nominal reception acknowledgement message corresponding to the packets of the data flow, generating the nominal reception acknowledgement message on behalf receiver if it is determined to generate the nominal reception acknowledgement message, and sending the nominal reception acknowledgement message to the transmitter; and at least one storage medium.

20 Claims, 7 Drawing Sheets

(51) Int. Cl.
  *H04L 29/06* (2006.01)
  *H04L 1/18* (2006.01)

(56) References Cited

U.S. PATENT DOCUMENTS

| | | | | |
|---|---|---|---|---|
| 2006/0098616 A1* | 5/2006 | Kish | .................... | H04L 1/1607 370/338 |
| 2008/0267184 A1* | 10/2008 | Arisoylu | ............. | H04L 41/0896 370/391 |
| 2010/0232294 A1* | 9/2010 | Samuels | ................. | H04L 12/24 370/235 |
| 2010/0284287 A1* | 11/2010 | Venuto | .................. | H04W 40/08 370/252 |

OTHER PUBLICATIONS

International Search Report in International Application No. PCT/IB2012/054547, dated Dec. 27, 2012.

Written Opinion of the international Searching Authority in International Application No. PCT/IB2012/054547, dated Dec. 27, 2012.

\* cited by examiner

METHOD AND SYSTEM FOR INCREASING DATA FLOW TRANSMISSION

TECHNICAL FIELD

The present invention relates in general to the field of computer networking. More precisely, the present invention discloses methods and systems for a network device for using multiple network connections and nominal reception acknowledgement message to increase the transmission rate of data packets of a data flow.

BACKGROUND ART

When a transmitting terminal needs to send data packets of a data flow, the transmitting terminal selects an appropriate transport protocol to send the data packets according to its requirements. There are many transport protocols, and one of them is the Transmission Control Protocol (TCP). According to TCP protocol, when a receiving terminal receives a data packet of a data flow, the receiving terminal reply by sending a reception acknowledgement message to the transmitting terminal informing that the data packet has been received by the receiving terminal. Then the transmitting terminal continues to send other data packets of the data flow. Also, the transmitting terminal uses the information of the reception acknowledgement message and the received time of the reception acknowledgement message to determine the transmission rate.

When a plurality of network connections simultaneously send the data packets of the data flow, the transmission rate can be improved. However, the data packets may not be received by the receiving terminal in correct order, it is possible for the receiving terminal to consider that it failed to receive some of the data packets. As a result, the receiving terminal may not promptly send the reception acknowledgement message to the transmitting terminal. Further, the reception acknowledgement message may not be received by the transmitting terminal sequentially, and hence the transmitting terminal may not calculate the transmission rate accurately. These can make the transmitting terminal unable to simultaneously send the data packets of a data flow at the maximum speed of the plurality of network connections.

DISCLOSURE OF INVENTION

Summary of Invention

The present invention discloses methods and systems for transmitting a data flow through a network device. The network device receives a data packet of a data flow from a transmitting terminal through at least one first network interface. Then the network device selects one access network from the at least two access networks of the at least two second network interfaces. The network device also encapsulates the data packet in an encapsulating packet and sends the encapsulating packet to a receiving terminal. The network device determines whether to create at least one nominal reception acknowledgement message corresponding to the data packet of the data flow. If the network device determine to create a nominal reception acknowledgement message, the nominal reception acknowledgement message is created on behalf of the receiving terminal. The network device sends the nominal reception acknowledgement message to the transmitting terminal.

According to one of the embodiments of the present invention, the network device controls the transmission rate of the nominal reception acknowledgement message sending to the transmitting terminal through one of the access networks of the second network connection interfaces.

According to one of the embodiments of the present invention, the network device must receive one or more reception acknowledgement messages from the receiving terminal through one of the second network interfaces before the network device sends the nominal reception acknowledgement message to the transmitting terminal.

According to one of the embodiments of the present invention, the nominal reception acknowledgement message corresponds to two or more data packets of the data flow.

According to one of the embodiments of the present invention, the network device stops to send a nominal reception acknowledgement message to the transmitting terminal if the network device does not receive one or more reception acknowledgement message from the receiving terminal through one of the second network interfaces for a period of time.

According to one of the embodiments of the present invention, the network device resends a data packet which is not confirmed by the receiving terminal, the data packet is encapsulated into an encapsulating packet.

According to one of the embodiments of the present invention, the data flow is based on TCP.

According to one of the embodiments of the present invention, the control unit selects one access network from access networks of the at least two second network interfaces according to the status of an access network. The status is selected from a group consisting of latency, reliability, speed.

According to one of the embodiments of the present invention, the network device selects one access network from access networks of at least two second network interfaces according to a network policy.

According to one of the embodiments of the present invention, the network device does not create a nominal reception acknowledgement message corresponding to the last data packet of the data flow.

DETAILED DESCRIPTION

The present invention relates to a method, a device and a system for solving the above technical problems. It mainly relates to the use of simultaneously transmitting data packets of a data flow through a plurality of network connections, improving transmission rate, so that a transmitting terminal simultaneously sends the data packets at about maximum speed of a plurality of network connections.

Figure 1:
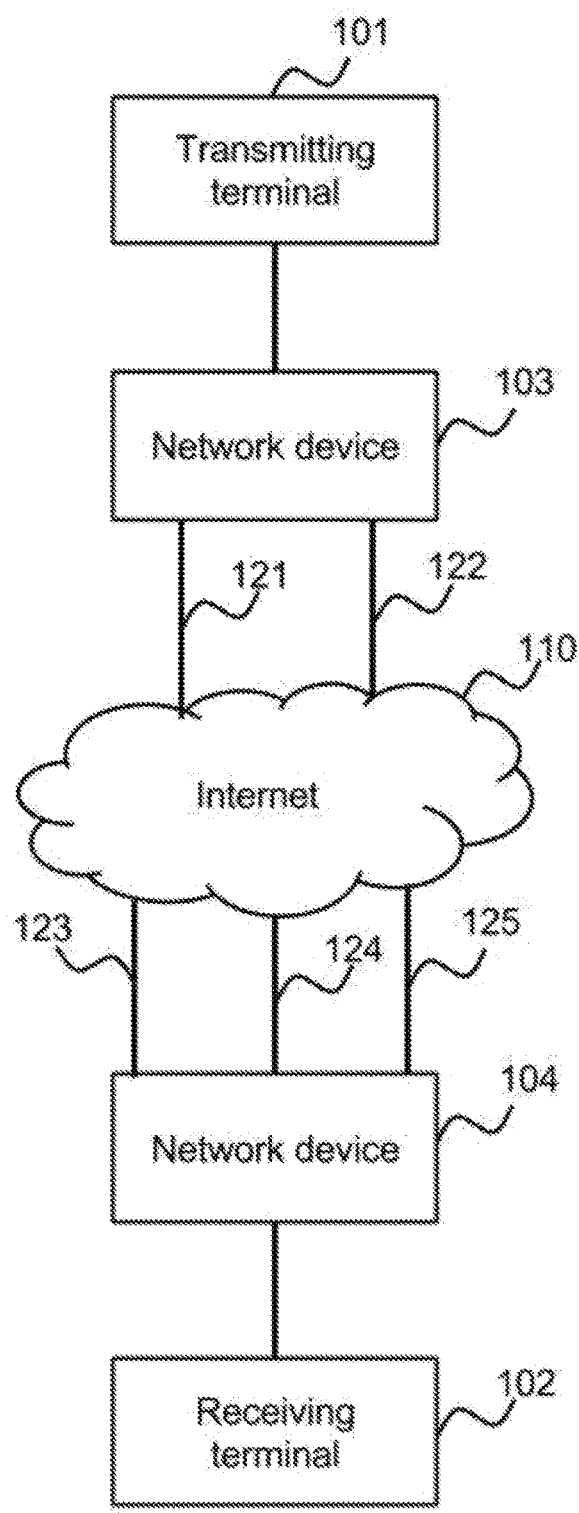
FIG. 1 illustrates a network environment according to various embodiments of the present invention.

FIG. 1 illustrates a network environment according to various embodiments of the present invention. Transmitting terminal 101 sends a data flow to receiving terminal 102. Transmitting terminal 101 is connected to network device 103. Network device 103 is connected to Internet 110 via network connections 121 and 122. Network device 104 is connected to Internet 110 via network connections 123,124 and 125. Receiving terminal 102 is connected to network device 104.

Transmitting terminal 101 and receiving terminal 102 can be any electronic device capable of transmitting and receiving data packets of data flows such as network hosts, routers, IP phones, IP cameras, computers, gateways, etc. Transmitting terminal 101 may not be the same as receiving terminal 102, for example, transmitting terminal 101 can be an IP camera, and receiving terminal 102 can be an IP phone.

Internet 110 is a network formed by interconnecting networks, these networks are interconnected through a common set of protocols. Internet 110 could be global, or could be restricted such as enterprise networks, intranet, virtual private network (VPN).

A network connection is a communication link of a network, such as a logical network, a VPN, etc. A network connection can be established on the Internet, Asynchronous Transfer Mode (ATM), Frame Relay, etc, using wired or wireless communication technologies to implement.

One of the embodiments of the present invention is network device 103. Another embodiment is the use of network device 103 which the network device is connected to transmitting terminal 101. If transmitting terminal 101 is capable of implementing the embodiments of the present invention, the present invention can also be performed at transmitting terminal 101. Network device 103 can be a router, a gateway, a wireless access point, etc. Network device 103 can be any device that functions as a router, in which a data packet can be sent to a destination through networks. Network device 103 has six options to send data packets, i.e. via network connections 121 and 123, via network connections 121 and 124, via network connections 121 and 125, via network connections 122 and 123, via network connections 122 and 124, via network connections 122 and 125. Similarly, network device 104 has six options to send data packets, i.e. via network connections 123 and 121, via network connections 123 and 122, via network connections 124 and 121, via network connections 124 and 122, via network connections 125 and 121, via network connections 125 and 122. In one embodiment, network devices 103 and 104 select a network connection according to the status of the network connection. In one embodiment, after network devices 103 and 104 selected a network connection, they continue to use the selected network connection until there is a change of status of the selected network connection, causing network devices 103 and 104 to select another network connection. In order to use different network connections to send a data flow, a data packet of the data flow is encapsulated in an encapsulating packet, and network device 104 retrieves the data packet of the data flow from the received encapsulating packet.

In one of the embodiments of the present invention, nominal reception acknowledgement messages are used. A nominal reception acknowledgement message is created by a network device according to a corresponding data packet of data flows, and the network device then sends the reception acknowledgement message to a transmitting terminal on behalf of a receiving terminal. The network device needs to set the source address of the nominal reception acknowledgement message as the IP address of the receiving terminal. Network device also needs to set other information of the nominal reception acknowledgement message such as options, header checksum, ports, serial number, confirmation number, etc, so that the transmitting terminal determines that the nominal reception acknowledgement message is sent by the receiving terminal. As a result, the transmitting terminal continues to send other data packets of a data flow to the receiving terminal. U.S. Pat. No. 7,295,512 discloses a method of creating a nominal reception acknowledgement message, and explains the benefits of nominal reception acknowledgement message. U.S. Pat. Nos. 6,701,370 and 7,337,233 also disclose the methods of creating and processing a nominal reception acknowledgement message. The nominal reception acknowledgement message, which is sent from a receiving terminal, corresponds to a data packet of a data flow. But U.S. Pat. Nos. 6,701,370, 7,295,512 and 7,337,233 did not disclose when and how to create a nominal reception acknowledgement message, how to use a nominal reception acknowledgement to affect sending of data packets of data flow at the transmitting terminal, how to use a plurality of network connections to send data packets of data flows and other techniques of the present invention.

Embodiment 1

Figure 2:
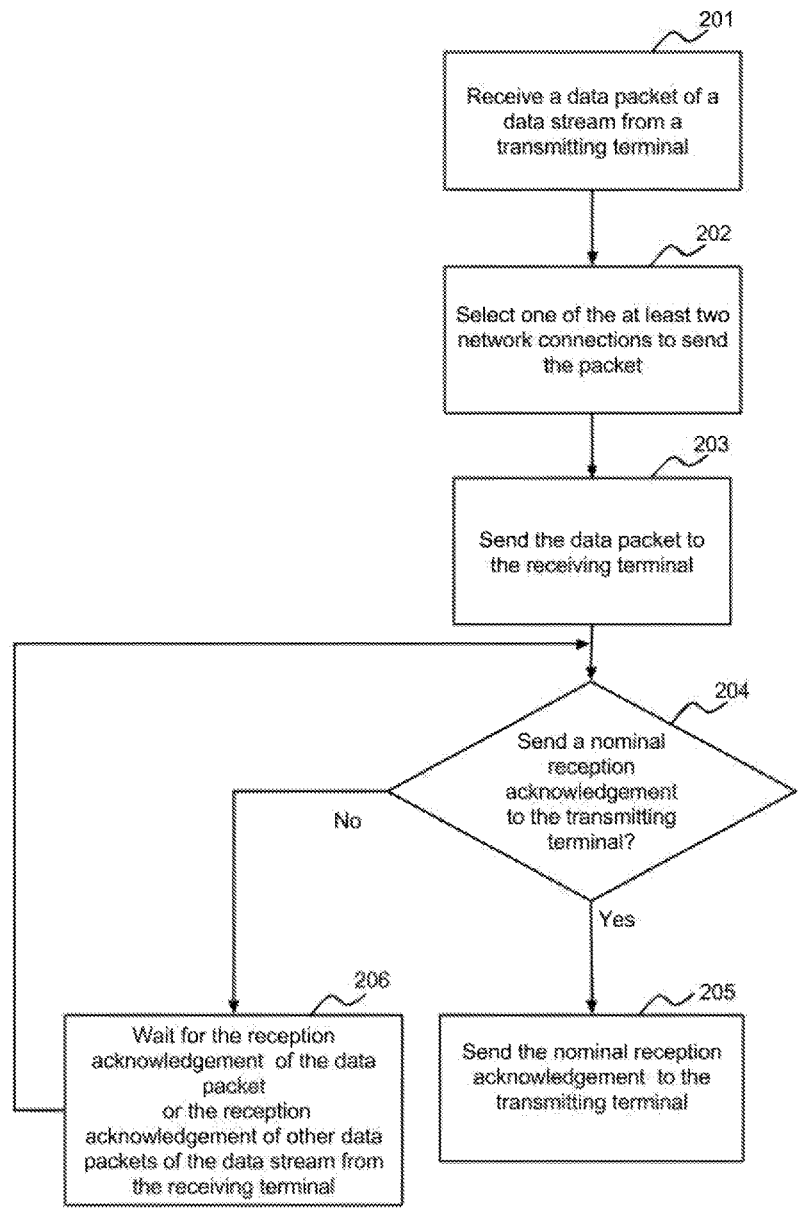
FIG. 2 is a flowchart illustrating a process according to one of the embodiments of the present invention.

FIG. 2 is a flowchart illustrating a process according to one of the embodiments of the present invention. When a network device receives a data packet of a data flow from a transmitting terminal in step 201, the network device selects one of at least two network connections to send the data packet in step 202. The destination of the data packet is a receiving terminal. The network device chooses the network connection based on the status of access network, such as latency, reliability, speed, etc. The network device also chooses the network connection based on network policy, the administrator's preference, costs, etc. In step 203, the network device encapsulates the data packet to an encapsulating packet, and uses the selected network connection to send the encapsulating packet to the receiving terminal. Then the network device determines whether to send the nominal reception acknowledgement message to transmitting terminal in step 204. The purpose of sending the nominal reception acknowledgement message is to allow the transmitting terminal to determine that the receiving terminal has sent a reception acknowledgement message to acknowledge the reception of the data packet. Therefore, transmitting terminal continues to send other data packets of the data flow. If the network device determines to send a nominal reception acknowledgement message to the transmitting terminal, the network device creates a corresponding nominal reception acknowledgement message, and send the corresponding nominal reception acknowledgement message to the transmitting terminal on behalf of the receiving terminal in step 205.

However, if the network device sends nominal reception acknowledgement message continuously, the transmitting terminal sends data packets of the data flow continuously, so there may be the possibility to run out of storage within the network device storage unit. The network device needs to store or cache the data packet before receiving a corresponding reception acknowledgement message from receiving terminal. It is because the network device needs to resend the data packet until the data packet has been received by receiving terminal. Alternatively, the network device stops attempts to resend the data packet.

Therefore, the network device needs to determine whether to send the nominal reception acknowledgement message in step 204 or waits for reception acknowledgement message of the data packet or other data packets of the data flow from the receiving terminal in step 206. One of the factors to be considered in step 204 is the storage size of the storage medium of network device that is available to store data packets. Other factors include the processing capacity of the network device, the speed of network connection, other requirements of the data flow, etc. Another key factor is whether the receiving terminal has sent a reception acknowledgement message, if the network device does not receive any reception acknowledgement message from the receiving terminal, the network device determines that the receiving terminal has not received any data packet of the data flow. Another factor is how long the receiving terminal has sent a reception acknowledgement message. If the network device has not received the reception acknowledgement message from the receiving terminal for a period of time, the network device determines that the receiving terminal failed to receive the data packet of the data flow. The period of time, depending on the nature of the data flow, may be in a range from one millisecond to twenty minutes. Due to TCP, the more typical period of times are one hundred seconds and three minutes. Further, if the network device has sent more than one data packet of a data flow to the receiving terminal, but does not receive any corresponding reception acknowledgement message from the receiving terminal. The network device determines that the receiving terminal may not receive more than one data packet based on the number of data packet of the data flow.

While the network device waits for the reception acknowledgement message of the data packet or data packets of a data flow from the receiving terminal in step 206, the network device is capable of performing other tasks.

When the network device is performing step 206, the network device continues to create a nominal reception acknowledgement message corresponding to a data packet of a data flow and sends the nominal reception acknowledgement message to the transmitting terminal, until the network device determines to stop sending the nominal reception acknowledgement message. In one embodiment, the network device stops creating nominal reception acknowledgement message corresponding to a data packet of a data flow, until the network device receives a reception acknowledgement message from the receiving terminal. The reception acknowledgement message is corresponding to data packets of a data flow sent by the network device, but does not include the data packet of a data flow recently sent by the network device.

The network device needs to configure the source address of a nominal reception acknowledgement message as the IP address of the receiving terminal, and it may need to configure other information of the nominal reception acknowledgement message such as options, header checksum, ports, serial number, confirmation number, etc. The transmitting terminal determines that the nominal reception acknowledgement message is sent by receiving terminal, therefore, the transmitting terminal continues to send other data packets of the data flow.

The network device controls the transmission rate or content of the nominal reception acknowledgement message, which affects the transmission rate of data packets at the transmitting terminal. For example, the network device increases the transmission rate of nominal reception acknowledgement message, in order to increase the transmission rate of data packets at the transmitting terminal. Also, the network device reduces the time interval between sending a nominal reception acknowledgement message and receiving a data packet, in order to increase the transmission rate of data packets at the transmitting terminal. Alternatively, the network device extends the time interval between sending a nominal reception acknowledgement message and receiving a data packet, in order to reduce the transmission rate of data packets at the transmitting terminal. Further, the network device increases the number of nominal reception acknowledgement message, in order to increase the transmission rate of data packets at the transmitting terminal. Alternatively, the network device decreases the number of sending nominal reception acknowledgement message, in order to reduce the transmission rate of data packets in transmitting terminal. For illustration purpose only, network device 103 selects a network connection based on the status of network connections. If network devices 103 and 104 select a network connection, network devices 103 and 104 continues to use the selected network connection, until a change in status of the network connection such that network devices 103 and 104 needs to select another network connection.

Network Connection

Embodiment 2

Figure 3:
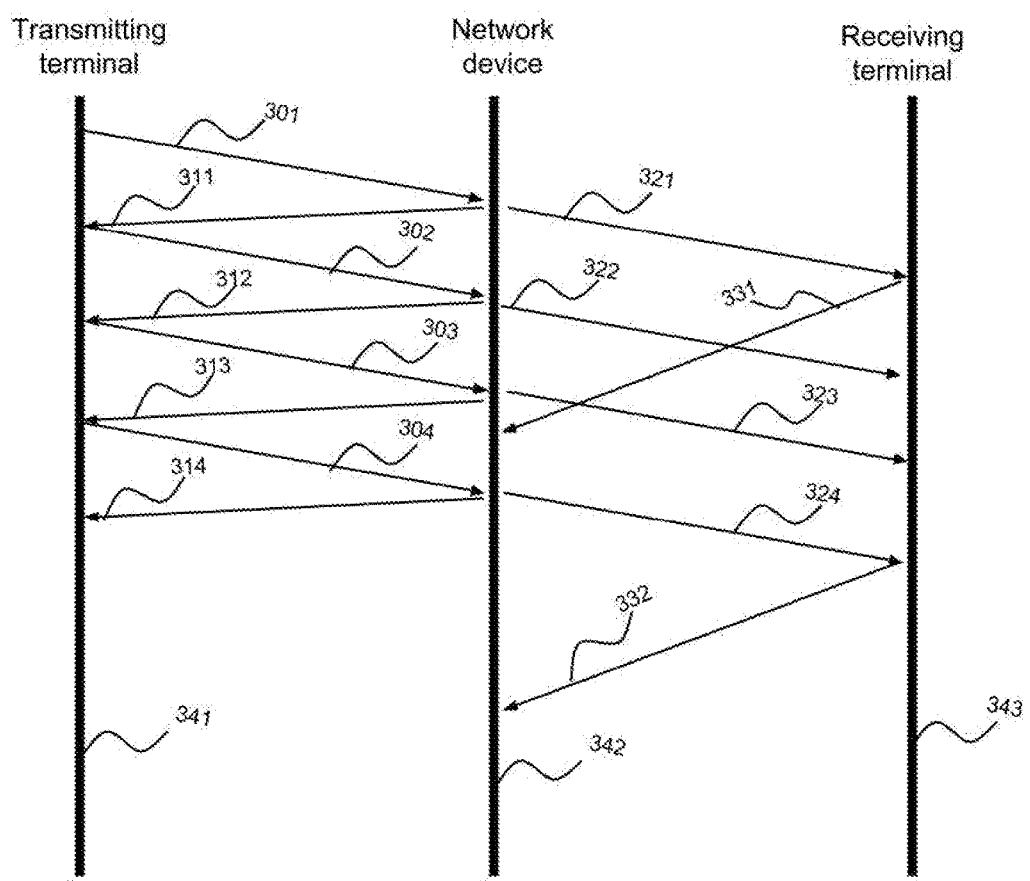
FIG. 3 is a sequence diagram illustrating for creating and sending a nominal reception acknowledgement message.

FIG. 3 illustrates how network device 342 creates and sends a nominal reception acknowledgement message according to one of the embodiments of the present invention. Firstly, transmitting terminal 341 sends a first data packet 301 of a data flow. When network device 342 receives first data packet 301, network device 342 encapsulates first data packet 301 into data packet 321 and send data packet 321 to receiving terminal 343. Network device 342 then creates and sends first nominal reception acknowledgement message 311 corresponding to first data packet 301. When transmitting terminal 341 receives first nominal reception acknowledgement message 311, transmitting terminal 341 determines that receiving terminal 343 has already received first data packet 301, therefore, transmitting terminal 341 sends second data packet 302. Similarly, after network device 342 has received second data packet 302, network device 342 encapsulates second data packet 302 in data packet 322 and sends data packet 322 to receiving terminal 343. Network device 342 then creates and sends second nominal reception acknowledgement message 312 corresponding to second data packet 302. When transmitting terminal 341 receives second nominal reception acknowledgement message 312, transmitting terminal 341 determines that receiving terminal 343 has received second data packet 302. Therefore, transmitting terminal 341 sends third data packet 303. So, network device 342 creates and sends third nominal reception acknowledgement message 313 and fourth nominal reception acknowledgement message 314 corresponding to third data packet 303 and fourth data packet 304 respectively. Further, network device 342 also encapsulates third data packet 303 and fourth data packet 304 into data packets 323 and 324 respectively and sends data packets 323 and 324 to receiving terminal 343.

When receiving terminal 343 has received first data packet 301 which is retrieved from data packet 321, receiving terminal 343 sends a reception acknowledgement message 331 corresponding to first data packet 301. Since first data packet 301 is encapsulated into data packet 321, receiving terminal 343 or other network devices needs to retrieve first data packet 301 from data packet 321 in order to process first data packet 301. Network device 342 does not send reception acknowledgement message 331 to transmitting terminal 341 because network device 342 has already sent first nominal reception acknowledgement message 311 to transmitting terminal 341. When receiving terminal 343 receives second data packet 302, which is encapsulated into data packet 322, receiving terminal 343 sends a reception acknowledgement message corresponding to the reception acknowledgement message of second data packet 302, or waits for the arrival of several data packets before sending a reception acknowledgement message corresponding to the several data packets. Reception acknowledgement message 332 corresponds to the second data packet 302, third data packet 303 and fourth data packet 304. Also, receiving terminal 343 or other network devices needs to retrieve second data packet 302, third data packet 303 and fourth data packet 304 from data packets 322, 323 and 324 respectively in order to process second data packet 302, third data packet 303 and fourth data packet 304.

If network device 342 does not receive a reception acknowledgement message, such as reception acknowledgement message 331, from receiving terminal 343 for a period of time, network device 342 determines that receiving terminal 343 failed to receive data packet 301. Network device 342 then resends data packet 321 until network device 342 knows that receiving terminal 343 has received data packet 321. Alternatively, network device 342 stops to resend the data packet. In one example, network device 342 has not received reception acknowledgement message 332 from receiving terminal 343, network device 342 determines that receiving terminal 343 failed to receive data packets 322, 323 and 324, network device 342 then resends data packets 322, 323 and 324 until network device 342 knows that receiving terminal 343 has received data packets 322, 323 and 324. Alternatively, network device 342 stops to resend the data packets.

Embodiment 3

Figure 4:
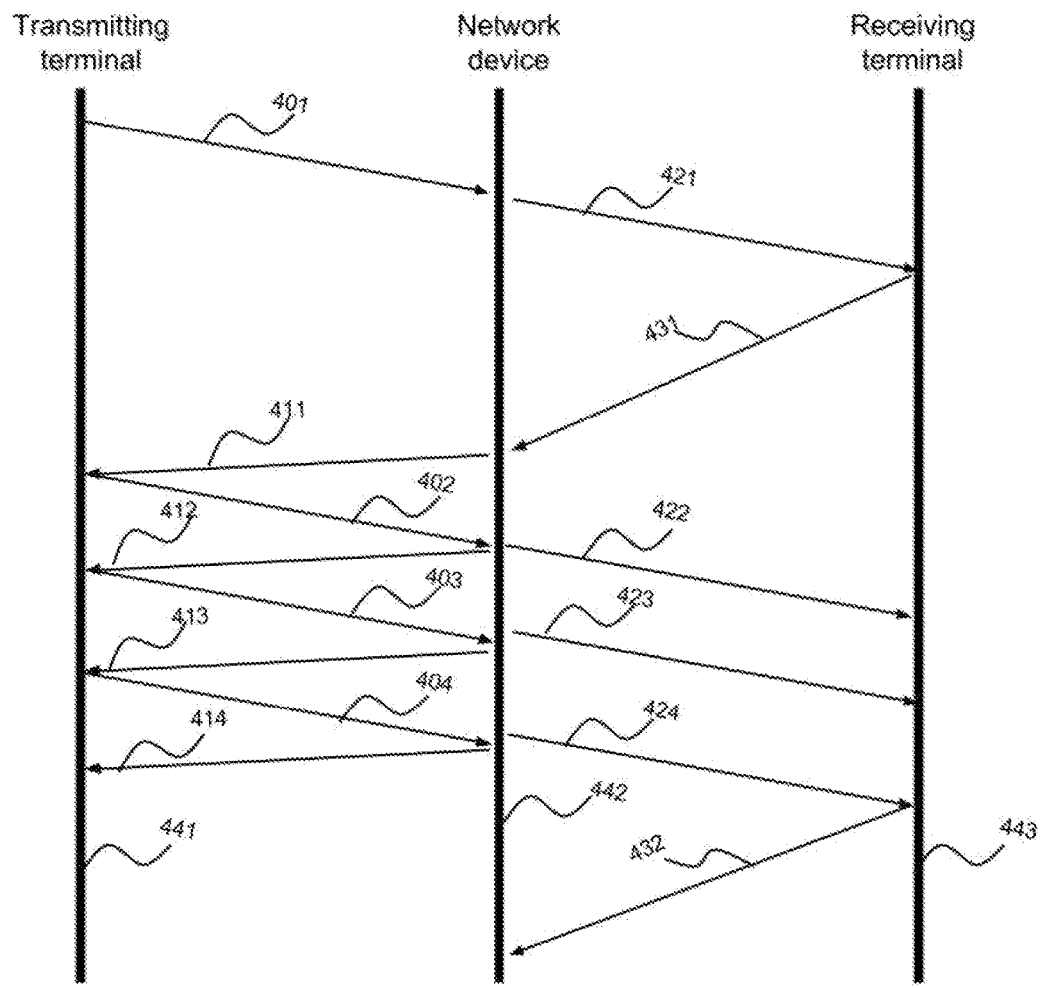
FIG. 4 is a sequence diagram illustrating for creating and sending a nominal reception acknowledgement message.

FIG. 4 illustrates how network device 442 creates and sends a nominal reception acknowledgement message according to one of the embodiments of the present invention.

Transmitting terminal 441 starts to send first data packet 401 of a data flow. When network device 442 has received first data packet 401, network device 442 encapsulates first data packet 401 in data packet 421 and sends data packet 421 to receiving terminal 443. Since data packet 421 is the first data packet sent by network device 442, network device 442 does not know whether receiving terminal 443 has received data packet 421, so network device 442 does not create or send any nominal reception acknowledgement message to transmitting terminal 441. However, when network device 442 receives reception acknowledgement message 431 from receiving terminal 443, network device 442 determines that receiving terminal 443 has received data packet 421, and starts to create and send a nominal reception acknowledgement message. Reception acknowledgement message 411 can be reception acknowledgement message 431 and can also be a nominal reception acknowledgement message created by network device 442.

After network device 442 receives second data packet 402, network device 442 encapsulates second data packet 402 into data packet 422 and sends data packet 422 to receiving terminal 443. Network device 442 also creates and sends second nominal reception acknowledgement message 412 corresponding to second data packet 402 to transmitting terminal 441. When transmitting terminal 441 has received second nominal reception acknowledgement message 412, transmitting terminal 441 determines that receiving terminal 443 has received second data packet 402. So transmitting terminal 441 sends third data packet 403 and forth data packet 404 of the data flow. Therefore, network device 442 creates and sends third nominal reception acknowledgement message 413 and fourth nominal reception acknowledgement message 414 corresponding to third data packet 403 and fourth data packet 404 respectively to transmitting terminal 441. Further, third data packet 403 and fourth data packet 404 are encapsulated in data packets 423 and 424 respectively and data packets 423 and 424 are sent to receiving terminal 443.

When receiving terminal 443 has received second data packet 402 which is encapsulated in data packet 422, receiving terminal 443 sends a reception acknowledgement message corresponding to second data packet 402. Receiving terminal 443 also waits for the arrival of other data packets before sending a reception acknowledgement message corresponding to the other data packets. Reception acknowledgement message 432 sent by receiving terminal 443 corresponds to second data packet 402, third data packet 403 and fourth data packet 404. Also, receiving terminal 443 or other network devices needs to retrieve second data packet 402, third data packet 403 and fourth data packet 404 from data packets 422, 423 and 424 respectively in order to process second data packet 402, third data packet 403 and fourth data packet 404 respectively.

If network device 442 does not receive a reception acknowledgement message, such as reception acknowledgement message 431, from receiving terminal 443 for a period of time, network device 442 determines that receiving terminal 443 failed to receive data packet 401. Network device 442 then resends data packet 421 until network device 442 knows that receiving terminal 443 has received data packet 421. Alternatively, network device 442 stops resending the data packet. In one example, when network device 442 does not receive reception acknowledgement message 432 from receiving terminal 443, network device 442 determines that receiving terminal 443 failed to receive data packets 422, 423 and 424. Network device 442 then resends data packets 422, 423 and 424 until network device 442 knows that receiving terminal 443 has received data packets 422, 423 and 424. Alternatively, network device 442 stops resending the data packets.

Embodiment 4

Figure 5:
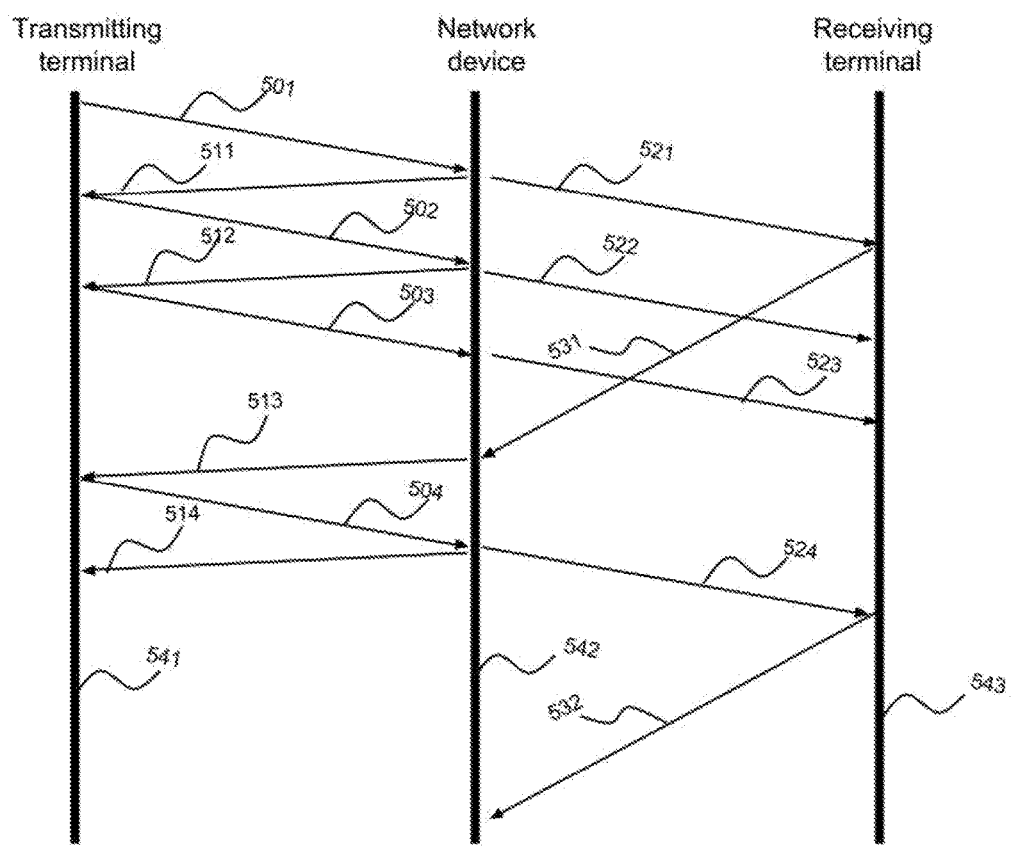
FIG. 5 is a sequence diagram illustrating for creating and sending a nominal reception acknowledgement message.

FIG. 5 illustrates how network device 542 creates and sends a nominal reception acknowledgement message according to one of the embodiments of the present invention.

Transmitting terminal 541 starts to send first data packet 501 of a data flow. When network device 542 receives first data packet 501, network device 542 encapsulates first data packet 501 into data packet 521 and send data packet 521 to receiving terminal 543. Then network device 542 creates and sends first nominal reception acknowledgement message 511 corresponding to first data packet 501 to transmitting terminal 541. When transmitting terminal 541 receives first nominal reception acknowledgement message 511, transmitting terminal 541 determines that receiving terminal 543 has received first data packet 501. Therefore, transmitting terminal 541 sends second data packet 502. Similarly, after network device 542 receives second data packet 502, network device 542 encapsulates second data packet 502 in data packet 522 and send data packet 522 to receiving terminal 543. Then network device 542 creates and sends second nominal reception acknowledgement message 512 corresponding to second data packet 502 to transmitting terminal 541. When transmitting terminal 541 receives second nominal reception acknowledgement message 512, transmitting terminal 541 determines that receiving terminal 543 has received second data packet 502. Therefore, transmitting terminal 541 sends third data packet 503.

When network device 542 receives third data packet 503, network device 542 may decide not to create and send third nominal reception acknowledgement message corresponding to third data packet 503. It may due to several reasons, such as network device 542 not having sufficient storage to store subsequent data packets of data flow, a problem in network connections between network device 542 and receiving terminal 543, etc. Network device 542 then waits for a reception acknowledgement message from receiving terminal 543.

When network device 542 receives reception acknowledgement message 531 corresponding to data packet 501 from receiving terminal 543, network device 542 determines that receiving terminal 543 has received data packet 501. Therefore, network device 542 does not need to store data packet 501. The reason for network device 542 storing data packet 501 is to ensure data packet 501 can be sent to receiving terminal 543. As network device 542 does not need to store data packet 501, network device 542 has sufficient storage to store subsequent data packets. As a result, network device 542 creates and sends nominal reception acknowledgement message 513 corresponding to third data packet 503 to transmitting terminal 541.

When transmitting terminal 541 receives nominal reception acknowledgement message 513, transmitting terminal 541 determines that receiving terminal 543 has received third data packet 503. Therefore, transmitting terminal 541 sends fourth data packet 504. Similarly, after network device 542 receives fourth data packet 504, network device 542 encapsulates fourth data packet 504 into data packet 524 and send data packet 524 to receiving terminal 543. Network device 542 also creates and sends fourth nominal reception acknowledgement message 514 corresponding to fourth data packet 504.

When receiving terminal 543 receives fourth data packet 504 which is encapsulated into data packet 524, receiving terminal 543 sends reception acknowledgement message 532 corresponding to the second, third and fourth data packet. As fourth data packet 504 is encapsulated in data packet 524, receiving terminal 543 or other network devices needs to retrieve fourth data packet 504 from data packet 524 in order to process fourth data packet 504.

If network device 542 does not receive a reception acknowledgement message, such as reception acknowledgement message 531, from receiving terminal 543 for a period of time, network device 542 determines that receiving terminal 543 failed to receive data packet 501. Then network device 542 resends data packet 521 until network device 542 knows that receiving terminal 543 has received data packet 521. Alternatively, network device 542 stops to resend the data packet. In one example, network device 542 does not receive reception acknowledgement message 532 from receiving terminal 543 for a period of time, network device 542 determines that receiving terminal 543 failed to receive data packet 522. Then network device 542 resends data packet 522 until network device 542 knows that receiving terminal 543 has received data packet 522. Alternatively, network device 542 stop to resend the data packets. Before network device 542 knows that receiving terminal 543 has received data packet 522, network device 542 does not resend data packets 523 and 524 in order to avoid an increase of network traffic loads.

In FIG. 5, it is assumed that transmitting terminal 541 needs to receive a reception acknowledgement message before sending the next data packet, but this is not the only method. Transmitting terminal 541 may send one or more data packets without receiving a reception acknowledgement message. For example, transmitting terminal 541 may use the size of TCP sliding window to determine the number of data packets that can be sent if no reception acknowledgement message is received.

Selection of Network Connection

Network devices 342, 442 and 542 are connected to two or more network connections. So when network devices 342, 442 and 542 send data packets, which are data packets 321, 322, 323, 324, 421, 422, 423, 424, 521, 522, 523 and 524, network devices 342, 442 and 542 select one of the network connections to send the data packets. Network devices 342, 442 and 542 use one of the network connections to send all data packets or use different network connections to send the data packets. Network devices 342, 442 and 542 select a network connection based on different reasons, such as the latency, costs, speed, the administrator's preference, reliability, etc.

Embodiment 5—Example of TCP/IP Protocol

In one embodiment, a data flow uses TCP protocol. According to TCP/IP protocol, there are three signals to confirm the establishment of a data flow between a transmitting terminal and a receiving terminal. They are "SYN", "ACK" and "FIN" signals. "SYN" is a synchronization flag, which is a initial sequence signal of the data flow. "ACK" represents a reception acknowledgement signal. After a transmitting terminal sent the initial "SYN" signal, the transmitting terminal sends a data packet to the receiving terminal. Then the receiving terminal sends "ACK" signal to the transmitting terminal to confirm the reception of the data packet. "FIN" is the last signal of a data flow sent by a transmitting terminal. These three signals are defined in TCP/IP protocol for establishing a data flow.

Figure 6:
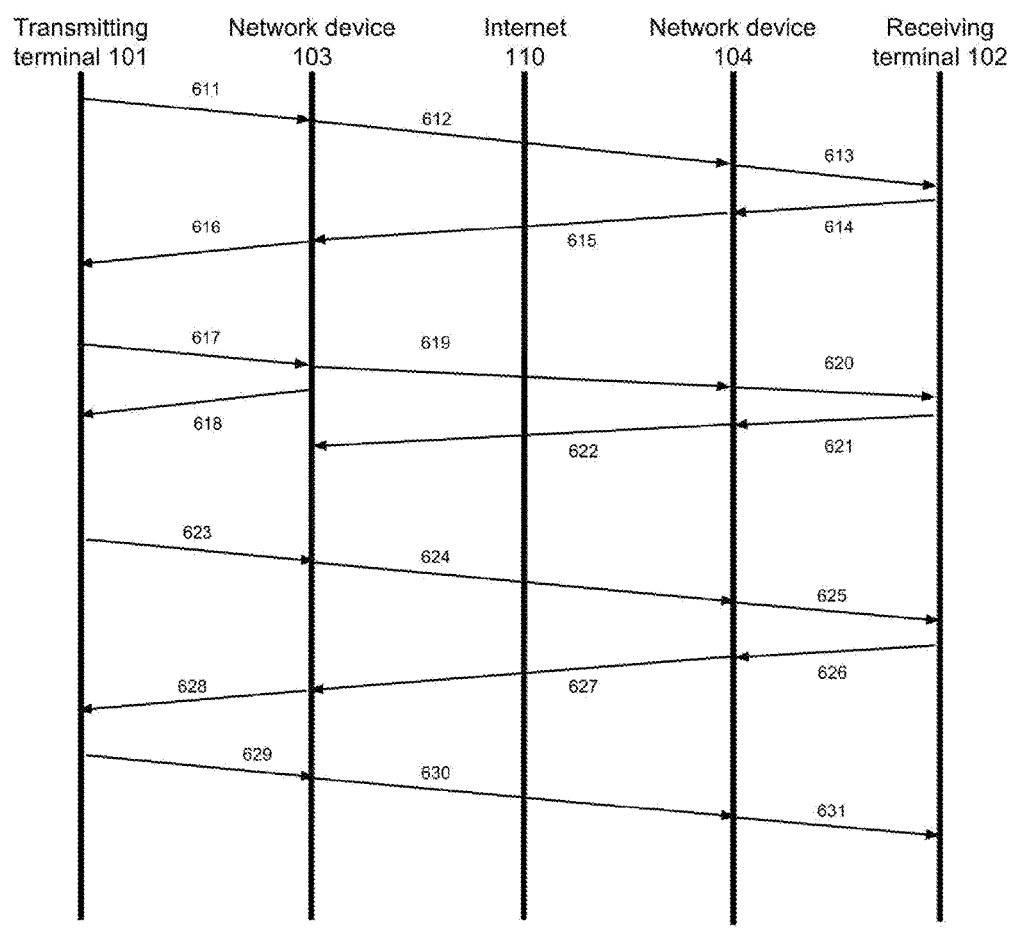
FIG. 6 is a sequence diagram illustrating a TCP transmission with reference of FIGS. 1.

FIG. 6 illustrates a TCP implementation with reference to a network environment as shown in FIG. 1. Network device 103 is connected to internet 110 via network connections 121 and 122. Network device 104 is connected to internet 110 via network connections 123, 124 and 125. Therefore, network device 103 have six options to send data packets, i.e. network connections 121 and 123, network connections 121 and 124, network connections 121 and 125, network connections 122 and 123, network connections 122 and 124, network connections 122 and 125. Similarly, network device 104 have six options to send data packets, i.e. network connections 123 and 121, network connections 123 and 122, network connections 124 and 121, network connections 124 and 122, network connections 125 and 121, network connections 125 and 122. In one embodiment, network devices 103 and 104 select a network connection based on the status of the network connection. In one embodiment, after network devices 103 and 104 have selected a network connection, they continue to use the selected network connection until any change of status of the selected network connection causing network devices 103 and 104 to select another network connection.

For illustration purpose only, an end-to-end connection is established between transmitting terminal 101 and receiving terminal 102. Transmitting terminal 101 sends SYN packet 611 to receiving terminal 102. As network device 103 does not know whether SYN packet 611 has been received by receiving terminal 102 and receiving terminal 102 does not agree on the network connection, network device 103 does not create and send a corresponding nominal reception acknowledgement message. Network device 103 encapsulates SYN packet 611 in data packet 612, and select a network connection from network connections 121 or 122, and select a network connection from network connections 123, 124 or 125 to send data packet 612.

After network device 104 has received data packet 612, network device 104 retrieves SYN packet 611 from data packet 612. Then network device 104 sends data packet 613 to receiving terminal 102. The content of data packet 613 is same as that of SYN packet 611. After receiving terminal 102 has received data packet 613, receiving terminal 102 reply ACK packet 614 to network device 104. Network device 104 encapsulates data packet 614 in data packet 615 and sends data packet 615 to network device 103 through internet 110. Network device 103 retrieves data packet 614 from data packet 615, and then sends data packet 616 to transmitting terminal 101. The content of data packet 616 is same as that of data packet 614.

After transmitting terminal 101 has received an ACK packet from receiving terminal 102, transmitting terminal 101 reply with an ACK packet and start to send other data packets to receiving terminal 102. The packets are combined into data packet 617. When network device 103 has received data packet 617, network device 103 reply by sending ACK packet 618 to transmitting terminal 101. ACK packet 618 is a nominal reception acknowledgement message. Also, network device 103 encapsulates data packet 617 in data packet 619 and sends data packet 619 to network device 104. Similar to data packet 612, network device 104 retrieves data packet 617 from data packet 619. Then network device 104 encapsulates data packet 617 into data packet 620 and send data packet 620 to receiving terminal 102. The content of data packet 620 is same as that of data packet 617.

After receiving terminal 102 has received data packet 620 from transmitting terminal 101, receiving terminal 102 reply to transmitting terminal 101 with ACK packet 621. After network device 104 has received ACK packet 621 and encapsulated ACK packet 621 in data packet 622, network device 104 selects one of the three network connections, 123, 124 or 125 to send data packet 622 to network device 103 through internet 110. As network device 103 has sent ACK packet 618 to transmitting terminal 101 on behalf of receiving terminal 102 previously, there is no need to send ACK packet 622 to transmitting terminal 101. Thereafter, the data transmission as described above continues until all data packets are sent.

If data packet 619 is lost during a data transmission, network device 103 continues to resend data packet 619 until network device 103 stops to do so. Network device 103 determines data packet 619 is lost if network device 103 has not received a reception acknowledgement message from receiving terminal 102 for a period of time.

Network device 103 can control the transmission rate or content of a nominal reception acknowledgement message, such as ACK packet 618, to affect transmission rate of data packets of transmitting terminal 101. In one embodiment, network device 103 increases the transmission rate of nominal reception acknowledgement message in order to increase the transmission rate of data packets at a transmitting terminal. In one embodiment, network device 103 increases the number of nominal reception acknowledgement message in order to increase transmission rate of data packets of a transmitting terminal.

However, when transmitting terminal 101 sends the last data packet, it may be required to add a FIN packet to inform receiving terminal 102 that the transmission has ended. The FIN packet is FIN packet 623. Network device 103 encapsulates FIN packet 623 in data packet 624 and sends data packet 624 to network device 104 through internet 110. Network device 104 retrieves FIN packet 623 from data packet 624 and sends data packet 625 to receiving terminal 102. The content of data packet 625 is same as that of FIN packet 623. As this is the last data packet, network device 103 does not create nominal reception acknowledgement message for the FIN packet 623. So transmitting terminal 101 does not consider all data packets of the TCP data flow have been received by receiving terminal 102.

After receiving terminal 102 has received FIN packet 623, receiving terminal 102 uses FIN packet 623 to create ACK packet 626 and reply to transmitting terminal 101 with a ACK packet 626. Network device 104 encapsulates ACK packet 626 in data packet 627 and sends data packet 627 to network device 103. Network device 103 retrieves ACK packet 626 from data packet 627 and then sends data packet 628 to transmitting terminal 101. The content of data packet 628 is same as that of ACK packet 626.

Finally, after data packet 628 has been received by transmitting terminal 101, transmitting terminal 101 reply with ACK packet 629 to receiving terminal 102. Network device 103 encapsulates ACK packet 629 in data packet 630 and sends data packet 630 to network device 104. Network device 104 retrieves ACK packet 629 from data packet 630 and then sends data packet 631 to receiving terminal 102. The content of data packet 631 is same as that of data packet 629.

Embodiment 6

Figure 7:
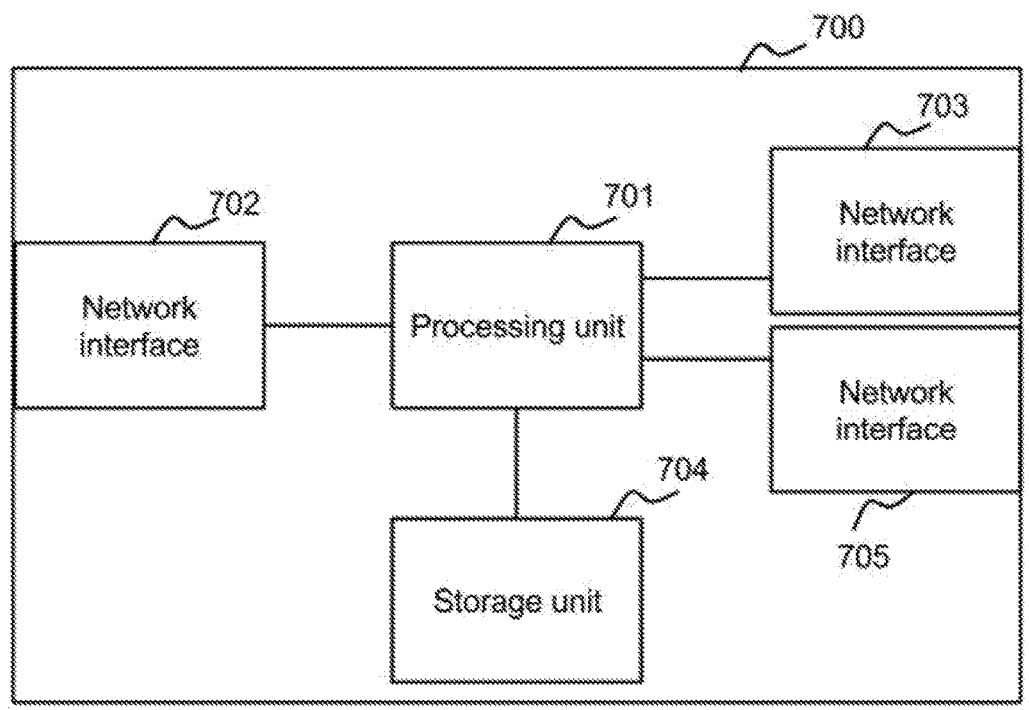
FIG. 7 is an illustrative block diagram of a network device according to one of the embodiments of the present invention.

FIG. 7 is an illustrative block diagram of network device 700 according to one of the embodiments of the present invention. Network device 700 comprises network interfaces 702, 703 and 705, processing unit 701 and storage unit 704. Processing unit 701 is connected to network interfaces 702, 703, 705 and storage unit 704. Processing unit 701 controls all operations of network device 700.

Network device 700 as shown in FIG. 7 could be a router. Network device 700 may be implemented by software or hardware. If network device 700 is implemented by hardware, network device 700 may have a chassis box. Network interfaces 702, 703, 705, processing unit 701 and storage unit 704 are soldered on a circuit board inside the chassis box.

A data packet which is sent by a sender is received through network interface 702 and then processed by processing unit 701. After processing unit 701 process the data packet, the data packet is sent to a sender through network interface 702. Processing unit 701 selects a network connection and network interfaces 703 or 705 according to different parameters, for example, the latency, costs, speed, the administrator's preference, reliability, etc. A data packet, which is sent to a sender from a receiving terminal, is received through network interfaces 703 or 705 and processed by processing unit 701. After a data packet is processed by processing unit 701, the data packet is sent to a receiving terminal. When processing unit 701 is processing a data packet, processing unit 701 uses storage unit 704 to store the data packet temporarily. Storage unit 704 is used to store data packets received from network interfaces 702,703 and 705 and instructions to processing unit 701. Processing unit 701 retrieves instructions from storage unit 704 and execute the retrieved instructions. Instructions causes processing unit 701 to implement various embodiments of the present invention.

The flowchart illustrated in FIG. 2 can be viewed in conjunction with FIG. 7. When network device 700 has received a data packet of a data flow from a transmitting terminal through network interfaces 703 or 705 in step 201, processing unit 701 of network device 700 selects one network connection from network interfaces 703 or 705 to send the data packet in step 202. The destination of the data packet is a receiving terminal. Processing unit 701 uses different parameters to select a network connection such as, latency, costs, speed, the administrator's preference, reliability, etc. In step 203, processing unit 701 encapsulates the data packet in an encapsulating packet and uses the selected network connection to send the encapsulating packet. In step 204, processing unit 701 determines whether to send a nominal reception acknowledgement message to the transmitting terminal. The purpose of the nominal reception acknowledgement message is for allowing the transmitting terminal to determine that the data packet has been received by the receiving terminal and the receiving terminal has sent a corresponding reception acknowledgement message. Transmitting terminal also continues to send other data packets of the data flow. If processing unit 701 decides to send a nominal reception acknowledgement message to transmitting terminal, processing unit 701 will create a nominal reception acknowledgement message corresponding to the data packet and send the message to transmitting terminal in step 205.

However, if processing unit 701 continuously sends nominal reception acknowledgement messages through network interfaces 703 or 705, the transmitting terminal continuously sends data packets of the data flow. There may be possibility to using up space in storage unit 704 of network device 700. Processing unit 701 needs to store a data packet before it received a corresponding reception acknowledgement message from the receiving terminal. The data packet is stored because processing unit 701 needs to resend the data packet until processing unit 701 knows the data packet has been received by the receiving terminal. Alternatively, processing unit 701 stops resending the data packet.

Processing unit 701 determines to send a nominal reception acknowledgement message corresponding to the data packet in step 204, or processing unit 701 waits for a reception acknowledgement message corresponding to the data packet or other data packets of a data flow from the receiving terminal. One of the factors to be considered in step 204 is the size of storage unit 704 that is available to store data packets. Other factors include the processing capacity of processing unit 701, the speed of network connection, other requirements of the data flow, etc. Another key factor is whether the receiving terminal has sent a reception acknowledgement message. If the processing unit 701 does not receive any reception acknowledgement message from the receiving terminal, processing unit 701 will determine that the receiving terminal has not received any data packet of the data flow. Another factor is how long the receiving terminal has sent a reception acknowledgement message. If processing unit 701 has not received the reception acknowledgement message from the receiving terminal through network interfaces 703 or 705 for a period of time, processing unit 701 determines that the receiving terminal failed to receive the data packets. Also, if processing unit 701 has sent more than one data packet of a data flow through network interfaces 703 or 705 to the receiving terminal, but it does not receive corresponding reception acknowledgement messages from the receiving terminal. Processing unit 701 determines that the receiving terminal does not receive more than one data packets based on the number of data packet of the data flow.

While processing unit 701 waits for the reception acknowledgement message of data packets of a data flow from the receiving terminal in step 206, processing unit 701 may perform other tasks.

When processing unit 701 is performing step 206, processing unit 701 continues to create a nominal reception acknowledgement message corresponding to a data packet of a data flow and send the nominal reception acknowledgement message to the transmitting terminal, until processing unit 701 determines to stop sending the message. In one embodiment, processing unit 701 stops creating a nominal reception acknowledgement message corresponding to a data packet of a data flow, until processing unit 701 receives a reception acknowledgement message from the receiving terminal. The reception acknowledgement message is corresponding to data packets of a data flow sent by processing unit 701, but it does not include the data packet of a data flow recently sent by processing unit 701.

In one embodiment, processing unit 701 does not start to create a nominal reception acknowledgement message corresponding to data packets of a data flow, until processing unit 701 receives at least one reception acknowledgement message corresponding to the data flow from the receiving terminal through network interfaces 703 or 705. In one embodiment, processing unit 701 does not start to create a nominal reception acknowledgement message corresponding to data packets of a data flow, until processing unit 701 receives a reception acknowledgement message corresponding to the first data packet of the data flow from the receiving terminal through network interfaces 703 or 705.

Selection of a network connection is according to the status of the network connection. In one embodiment, after processing unit 701 has selected a network connection, processing unit 701 continues to use the selected network connection until there is a change of status of the network connection causing processing unit 701 to select another network connection.

Processing unit 701 needs to configure the source address of a nominal reception acknowledgement message as the IP address of the receiving terminal, and it may also need to configure other information of the nominal reception acknowledgement message such as options, header checksum, ports, serial number, confirmation number, etc. The transmitting terminal determines that the nominal reception acknowledgement message is sent by the receiving terminal, therefore, the transmitting terminal continues to send other data packets of the data flow.

Processing unit 701 controls the transmission rate or content of the nominal reception acknowledgement message and it affects the transmission rate of data packets at the transmitting terminal. For example, processing unit 701 increases the transmission rate of nominal reception acknowledgement message in order to increase the transmission rate of data packets at the transmitting terminal. Also, processing unit 701 reduces the time interval between sending a nominal reception acknowledgement message and receiving a data packet in order to increase the transmission rate of data packets at the transmitting terminal. Alternatively, processing unit 701 extends the time interval between sending a nominal reception acknowledgement message and receiving a data packet, in order to reduce the transmission rate of data packets at the transmitting terminal. Further, processing unit 701 increases the number of nominal reception acknowledgement messages, in order to increase the transmission rate of data packets at the transmitting terminal. Alternatively, processing unit 701 decreases the amount of nominal reception acknowledgement message, in order to reduce the transmission rate of data packets at the transmitting terminal.

In one embodiment, processing unit 701 selects a network connection according to the status of the network connection. In one embodiment, after processing unit 701 has selected a network connection, processing unit 701 continues to use the selected network connection until there is a change of status of the network connection causing processing unit 701 to select another network connection.

Processing unit 701 may be made up of one or several processing units. A processing unit may be a Central Processing Unit (CPU), a programmable device, an Application Specific Integrated Circuit (ASIC), a microcontroller, a microprocessor, etc.

Network interfaces 702, 703 or 705 may be an Ethernet interface, an universal serial bus (USB) interface, WiMax modem, IEEE 802.11 modem, Long Term Evolution (LTE) modem, 3G modem, etc.

Storage unit 704 may be a storage medium for storing data packets, program instructions, data, etc. It may also store all information in a computer including the original input data, computer programs, operating results and final intermediate operation results. A storage medium may be a random access memory (RAM), a hard disk, a floppy disk, an optical disk, a magneto-optical disc, magnetic disk, flash memory, etc.

The invention claimed is:

1. A system for transmitting a data flow, comprising:
at least one first network interface connected to a transmitting terminal; and
at least two second network interfaces connected to a receiving terminal through at least two access networks;
at least one storage unit; and
at least one processing unit is used for:
(a) receiving a data packet of a data flow from the transmitting terminal through the at least one first network interface;
(b) selecting one access network from the at least two access networks and sending an encapsulating packet to the receiving terminal via the selected access network, wherein the encapsulating packet encapsulates the data packet; wherein the selected access network is used until there is a change of status of the selected access network;
(c) determining whether to create at least one nominal reception acknowledgement message corresponding to the data packet of the data flow; wherein the determining is based on at least one of: storage size of at least one storage unit available to store data packets, speed of network connection, processing capacity of the system;
(d) if it is determined to create at least one nominal reception acknowledgement message, the at least one nominal reception acknowledgement message is created on behalf of the receiving terminal;
(e) sending the at least one nominal reception acknowledgement message to the transmitting terminal; wherein network device stops creating and sending nominal reception acknowledgement message until the network device receives a reception acknowledgement message from the receiving terminal;
(f) if it is determined not to create at least one nominal reception acknowledgement message: waiting for a reception acknowledgement of the data packet or a reception acknowledgement of other data packets of the data flow from the receiving terminal;
(g) if no reception acknowledgement is received from the receiving terminal within a predefined time period: resending the encapsulating packet to the receiving terminal; wherein if a reception acknowledgement message corresponds to two or more data packets of the data flow, resending encapsulating packets encapsulating the two or more data packets of the data flow corresponding to the reception acknowledgement message;
(h) controlling the transmission rate of sending the at least one nominal reception acknowledgement message to the transmitting terminal, comprising: increasing the transmission rate of sending the at least one nominal reception acknowledgement message for increasing transmission rate of data packets at the transmitting terminal; and decreasing the transmission rate of sending the at least one nominal reception acknowledgement message for decreasing transmission rate of data packets at the transmitting terminal;
(i) when the data flow uses transmission control protocol (TCP), receiving a synchronization (SYN) packet from the transmitting terminal; transmitting a SYN encapsulating packet to the receiving terminal, wherein the SYN encapsulating packet encapsulates the SYN packet; wherein the SYN packet is used for establishing the data flow;
wherein the at least one storage unit storing program instructions executable by the at least one processing unit and temporarily storing data packets of the data flow; and
wherein the at least one processing unit is connected to the at least one first network interface, the at least two second network interfaces and the at least one storage unit.

2. The system of claim 1, wherein the at least one processing unit is further used for configuring source address of the nominal reception acknowledgement message as the Internet Protocol (IP) address of the receiving terminal, and configuring other information of the nominal reception acknowledgement message, wherein the other information comprising options, header checksum, ports, serial number, confirmation number.

3. The system of claim 1, wherein the at least one processing unit is further used for confirming the reception of one or more reception acknowledgement messages from the receiving terminal through one of the at least two second network interfaces before transmitting the at least one nominal reception acknowledgement message to the transmitting terminal.

4. The system of claim 1, wherein the at least one nominal reception acknowledgement message corresponds to two or more data packets of a data flow.

5. The system of claim 1, wherein the at least one processing unit is further used for stopping to send at least one nominal reception acknowledgement message to the transmitting terminal if the at least one processing unit does not receive one or more reception acknowledgement message from the receiving terminal through one of the at least two second network interfaces for a period of time.

6. The system of claim 5, wherein the at least one processing unit is further used for re-sending a data packet which is not confirmed by the receiving terminal and the data packet is encapsulated in an encapsulating packet.

7. The system of claim 1, wherein the data flow is based on TCP.

8. The system of claim 1, wherein the selection of step (b) is based on status of the at least two access networks; wherein the status is selected from a group consisting of latency, reliability, and speed.

9. The system of claim 1, wherein the selection of step (b) is based on a network policy.

10. The system of claim 1, wherein the at least one processing unit is further used for not creating a nominal reception acknowledgement message corresponding to the last data packet of the data flow.

11. A method for transmitting a data flow through a system, comprising:
   (a) receiving a data packet of a data flow from the transmitting terminal through the at least one first network interface;
   (b) selecting one access network from the at least two access networks and sending an encapsulating packet to the receiving terminal via the selected access network, wherein the encapsulating packet encapsulates the data packet; wherein the selected access network is used until there is a change of status of the selected access network;
   (c) determining whether to create at least one nominal reception acknowledgement message corresponding to the data packet of the data flow; wherein the determining is based on at least one of: storage size of at least one storage unit available to store data packets, speed of network connection, processing capacity of the system;
   (d) if it is determined to create at least one nominal reception acknowledgement message, the at least one nominal reception acknowledgement message is created on behalf of the receiving terminal;
   (e) sending the at least one nominal reception acknowledgement message to the transmitting terminal; wherein network device stops creating and sending nominal reception acknowledgement message until the network device receives a reception acknowledgement message from the receiving terminal;
   (f) if it is determined not to create at least one nominal reception acknowledgement message: waiting for a reception acknowledgement of the data packet or a reception acknowledgement of other data packets of the data flow from the receiving terminal;
   (g) if no reception acknowledgement is received from the receiving terminal within a predefined time period: resending the encapsulating packet to the receiving terminal; wherein if a reception acknowledgement message corresponds to two or more data packets of the data flow, resending encapsulating packets encapsulating the two or more data packets of the data flow corresponding to the reception acknowledgement message;
   (h) controlling the transmission rate of sending the at least one nominal reception acknowledgement message to the transmitting terminal, comprising: increasing the transmission rate of sending the at least one nominal reception acknowledgement message for increasing transmission rate of data packets at the transmitting terminal; and decreasing the transmission rate of sending the at least one nominal reception acknowledgement message for decreasing transmission rate of data packets at the transmitting terminal;
   (i) when the data flow uses transmission control protocol (TCP), receiving a synchronization (SYN) packet from the transmitting terminal; transmitting a SYN encapsulating packet to the receiving terminal, wherein the SYN encapsulating packet encapsulates the SYN packet; wherein the SYN packet is used for establishing the data flow;
   wherein the at least one storage unit storing program instructions executable by the at least one processing unit and temporarily storing data packets of the data flow; and
   wherein the at least one processing unit is connected to the at least one first network interface, the at least two second network interfaces and the at least one storage unit.

12. The method of claim 11, further comprising: configuring source address of the nominal reception acknowledgement message as the Internet Protocol (IP) address of the receiving terminal, and configuring other information of the nominal reception acknowledgement message, wherein the other information comprising options, header checksum, ports, serial number, confirmation number.

13. The method of claim 11, further comprising: confirming the reception of one or more reception acknowledgement message from the receiving terminal through one of the at least two second network interfaces before transmitting the at least one nominal reception acknowledgement message to the transmitting terminal.

14. The method of claim 11, wherein the at least one nominal reception acknowledgement message corresponds to two or more data packets of a data flow.

15. The method of claim 11, further comprising: stopping to send at least one nominal reception acknowledgement message to the transmitting terminal if the at least one processing unit does not receive one or more reception acknowledgement message from the receiving terminal through one of the at least two second network interfaces for a period of time.

16. The method of claim 15, further comprising: re-sending a data packet which is not confirmed by the receiving terminal and the data packet is encapsulated in an encapsulating packet.

17. The method of claim 11, wherein the data flow is based on TCP.

18. The method of claim 11, wherein the selection of step (b) is based on status of the at least two access networks; wherein the status is selected from a group consisting of latency, reliability, and speed.

19. The method of claim 11, wherein the selection of step (b) is based on a network policy.

20. The method of claim 11, further comprising: not creating at least one nominal reception acknowledgement message corresponding to the last data packet of the data flow.

* * * * *